3,763,124
TREATMENT OF THE ALKALI METAL SULFIDE REACTANT TO REDUCE IMPURITIES AND ITS REACTION WITH A POLYHALO-SUBSTITUTED AROMATIC COMPOUND

James T. Edmonds, Jr., Bartlesville, Okla., assignor to Phillips Petroleum Company
No Drawing. Filed June 21, 1971, Ser. No. 155,258
Int. Cl. C08g 23/00
U.S. Cl. 260—79.1    11 Claims

ABSTRACT OF THE DISCLOSURE

An improved method of preparing arylene sulfide polymers results from treatment of the alkali metal sulfide reactants prior to reaction with polyhalo-substituted aromatic compounds. The method is one which comprises the steps of: (1) contacting an alkali metal sulfide reactant comprising an alkali metal sulfide and an impurity selected from the class consisting of alkali metal hydrosulfide, alkali metal thiosulfate, and mixtures thereof, with an alkali metal hydroxide; and (2) subsequently reacting the thus contacted alkali metal sulfide reactant with a polyhalo-substituted aromatic compound to form an improved arylene sulfide polymer.

---

This invention relates to treated alkali metal sulfides, a method of treating an alkali metal sulfide, and a method of reacting a treated alkali metal sulfide with a polyhalo-substituted aromatic compound.

In the commercial development of arylene sulfide polymers, it has been found that certain impurities or contaminants contained within commercial alkali metal sulfides significantly affect the uniformity of chemical and physical properties of the polymer. For example, the polymer melt flow of an arylene sulfide polymer, after curing under a given set of conditions, varies widely depending not only upon the type but also the amount of chemical contaminant associated with commercial grades of the alkali metal sulfide reactant. The term "curing" as used herein refers to increasing the molecular weight of the polymer by crosslinking and/or chain extension, e.g., by heating in air. Virgin, i.e., uncured, arylene sulfide polymers prepared as described hereinafter are characterized by polymer melt flow index values of approximately three thousand (3000) to six thousand (6000). These melt flow index values reflect the weight in grams of polymer which pass through a 0.0825-inch orifice ASTM Model D-1238 melt indexer, at a test temperature of 650° F. under a constant molten polymer load of 5 kilograms during a ten-minute interval. Virgin polymer which has been cured by heating at 500° F. for six hours in the presence of air prior to testing yields polymer sometimes having melt flow index values as high as two to three thousand (2000 to 3000), when tested in accordance with the method described hereinbefore. Arylene sulfide polymers having melt flow index values, after heating at 500- F. for six hours in the presence of air, within the range of from 0 to 2000, preferably from 0 to 1000, and even more preferably from 0 to 500, are preferentially employed in commercial arylene sulfide polymer applications.

It is an object of this invention to prepare arylene sulfide polymers. Another object is to prepare arylene sulfide polymers that have improved physical and chemical properties. Still another object is to prepare arylene sulfide polymers preferentially employed in commercial applications.

According to this invention, an alkali metal sulfide reactant is treated to reduce impurities contained therein. Further, an alkali metal sulfide reactant is treated with alkali metal hydroxide. Still further, a treated alkali metal sulfide reactant is reacted with a polyhalo-substituted aromatic compound.

Suitable treatment of the alkali metal sulfide reactant employed in the preparation of arylene sulfide polymers can vary widely and depends upon the type and quantity of alkali metal impurity contained within the commercial alkali metal reactant.

Representative of commercially produced alkali metal sulfide reactant, i.e., sodium sulfide, $Na_2S$, illustrating the type and quantity of impurities contained therein, is shown hereafter in Table I.

TABLE I

| Sodium sulfide, $Na_2S$: commercial constituents | Sodium sulfide, $Na_2S$: commercial specification | Sodium sulfide, $Na_2S$: analysis of commercial product | | | | |
|---|---|---|---|---|---|---|
| | | Lot 1 | Lot 2 | Lot 3 | Lot 4 | Lot 5 |
| Wt. percent: | | | | | | |
| $Na_2S$ | 61.40 | 58.3 | 57.6 | 58.8 | 59.8 | 58.0 |
| NaHS | 0.00 | 0 | 2.9 | 0 | 0.8 | 0.3 |
| NaOH | 0.50 | 0.1 | 0 | 0 | 0 | 0 |
| $Na_2S_2O_3$ | 1.3 | 0.55 | 1.06 | 0.63 | 0.72 | 0.67 |
| Others [1] | | 0.62 | 1.16 | 1.34 | 2.21 | 1.63 |
| $H_2O$ [2] | | (²) | (²) | (²) | (²) | (²) |

[1] Others including $Na_2SO_3$, $Na_2SO_4$, $Na_2CO_3$, $Fe_2O_3$
[2] $H_2O$, water of crystallinity in amounts sufficient to total 100 wt. percent sulfide flake.

The impurities within the commercial alkali metal sulfide reactant which affect the melt flow characteristics of arylene sulfide polymers are alkali metal hydrosulfides, and alkali metal thiosulfates. The exact nature of the mechanism by which these impurities affect the melt flow of arylene sulfide polymers is not understood or readily explained on the theoretical basis. Accordingly, the scope of this invention is not to be limited by the specific examples which illustrate the effects of these impurities on the melt flow index characteristics of arylene sulfide polymers but are to be construed as examples of the best mode of practicing this invention.

EXAMPLE I

Polyphenylene sulfide was produced by reaction of commercial $Na_2S$ (dehydrated to a level of 1.0–1.4 moles of water per mole of $Na_2S$ prior to the reaction and p-dichlorobenzene (freeze point purity 52.85° C.) in the presence of the solvent N-methyl-2-pyrrolidone (99.6% min. purity). The reaction was carried out at a nominal temperature of 475° F. during a 3-hour period. Polymer and by-product NaCl was separated from the reaction products by flashing the solvent from the reaction media and further dried in a heated conveyor dryer. The NaCl byproduct was removed from the polymer by extraction with water in three steps each followed by a filtration to separate polymer and salt. The polymer was then dried before further processing by molding or coating in further polymer evaluations.

EXAMPLE II

In Table I, of this example, the melt flow data obtained from arylene sulfide polymers prepared in accordance with the procedure described in Example I, followed by heat curing, are reported and correlated with the amount of alkali metal sulfide impurity, i.e., NaHS, contained in commercial $Na_2S$ reactant. The commercial $Na_2S$ had not been treated prior to being charged to the reaction media prior to reaction with the polyhalo-substituted aromatic compound. Melt flow data showing the value to which the flow rate of arylene sulfide polymers was reduced, as crosslinking or chain extension of the polymer took place while in contact with air near its melting point, was obtained according to the following procedure. Approximately 20 grams of arylene sulfide polymer was heated in a small aluminum dish in a forced draft oven at 500° F. for 6 hours. The melt flow, expressed in grams per 10 minutes, was run in a modified ASTM Model D-1238 melt index apparatus at 650° F. under a constant 5 kilogram weight load. The arylene sulfide polymer samples were preheated for 5 minutes prior to extrusion, and the amount of polymer flow was determined by measuring the grams of polymer extrudate during a 10-minute time interval. The faster the polymer cured, the smaller the amount of extrudate, the lower the melt flow number.

TABLE I
[Effect of NaHS on polymer properties]

| Run | $Na_2S$ analyses; wt. percent | | Polymer properties after cure | |
|---|---|---|---|---|
| | $Na_2S$ | NaHS | IV [1] | Melt flow |
| 1 | 60.6 | 3.5 | 0.12 | 711 |
| 2 | 60.8 | 3.0 | 0.16 | 642 |
| 3 | 60.5 | 1.5 | 0.16 | 425 |
| 4 | 60.5 | 1.5 | 0.14 | 402 |
| 5 | 59.6 | 0.8 | 0.19 | 100 |
| 6 | 59.6 | 0.8 | 0.17 | 41 |
| 7 | 60.2 | 0.6 | 0.14 | 39 |
| 8 | 60.2 | 0.6 | 0.16 | 30 |
| 9 | 60.2 | 0.6 | 0.16 | 23 |
| 10 | 60.5 | 0.2 | 0.17 | 8 |
| 11 | 59.6 | 0.1 | 0.20 | 8 |
| 12 | 59.6 | 0.1 | 0.19 | 8 |
| 13 | 59.6 | 0.1 | 0.17 | 8 |

[1] Intrinsic viscosity of the polymers was measured at 260° C. in naphthalene.

As illustrated, the higher the NaHS content, the higher the melt flow index rate; conversely, the lower the NaHS content, the lower the melt flow index rate.

EXAMPLE III

Commercially prepared sodium sulfide containing varying amounts of alkali metal hydrosulfide, i.e., NaHS was reacted with para-dichlorobenzene in accordance with procedure described in Example I. Prior to charging the $Na_2S$ to the reaction media the commercial $Na_2S$ was treated accordingly: Run 1, the $Na_2S$ reactant was charged as received, i.e., untreated; Run 2, the $Na_2S$ reactant was treated with sufficient alkali metal hydroxide, i.e., NaOH, to reduce the NaHS content to 1.0 weight percent by weight of $Na_2S$; Runs 3, 4, and 5, the $Na_2S$ reactant was treated with sufficient NaOH to reduce the NaHS content to 0.0 weight percent by weight of $Na_2S$; Run 6, the $Na_2S$ reactant was treated with sufficient NaOH to reduce the NaHS content to 0.0 weight percent of $Na_2S$ plus 0.5 weight percent NaOH based on the weight of $Na_2S$ present. All NaOH additions were carried out prior to dehydration of the sodium sulfide and prior to reaction with the para-dichlorobenzene.

Summarized hereafter in Table I are the type and amount of chemical impurity contained within the sodium sulfide reactant prior to being reacted with p-dichlorobenzene, correlated with the melt flow data obtained on the resulting polyarylene sulfide polymer after heat curing as in Example II. The melt flow procedure employed were the same as those described in Example II.

TABLE I

| Run No. | Weight percent | | | Polyphenylene sulfide polymer properties | |
|---|---|---|---|---|---|
| | NaHS in commercial $Na_2S$ | NaHS in treated $Na_2S$ reactant | NaOH in treated $Na_2S$ reactant | IV | Melt flow after cure |
| 1 | 2.9 | 2.9 | 0.0 | 0.16 | 1,920 |
| 2 | 2.9 | 1.0 | 0.0 | 0.18 | 90 |
| 3 | 2.9 | 0.0 | 0.0 | 0.18 | 28 |
| 4 | 2.3 | 0.0 | 0.0 | 0.14 | 7 |
| 5 | 1.0 | 0.0 | 0.0 | 0.18 | 4 |
| 6 | 1.0 | 0.0 | 0.5 | 0.18 | 0 |

The above data illustrate that control of alkali metal impurities such as alkali metal hydrosulfide can be affected by the addition of alkali metal hydroxide to commercial sodium sulfide. Not only does the addition of alkali metal hydroxide affect or counteract the undesirable effects of alkali metal hydrosulfide on polymer cure rate and melt flow characteristics of the resulting polymer thus cured, but apparently materially and independently contributes to a rapid cure rate and a correspondingly reduced polymer melt flow of the polymer thus cured.

EXAMPLE IV

A series of runs were made to determine the effect of the alkali metal thiosulfate impurity, i.e., sodium thiosulfate, in commercial sodium sulfide in the prapration of polyphenylene sulfide. Analysis of untreated commercial hydrated sodium sulfide used was 58.3 weight percent sodium sulfide; 0.1 weight percent sodium hydroxide; 0.55 weight percent sodium thiosulfate; 0.08 weight percent sodium sulfite; 0.44 weight percent sodium sulfate; and 0.1 weight percent sodium carbonate. The weight percent of all components exclusive of sodium sulfide were based on the weight of sodium sulfide contained in the hydrated sodium sulfide commercial flake.

Polymer runs were made by charging 1004 grams commercial sodium sulfide flake, 2.4 milliliters of a 45.8 weight percent sodium hydrosulfide solution to neutralize the sodium hydroxide impurity by converting it to sodium sulfide, and the treated sodium sulfide was then added along with 2.5 liters of N-methyl-2-pyrrolidone to a reactor. Water was distilled from the reactor and then 1128 grams of p-dichlorobenzene in 500 milliliters of N-methyl-2-pyrrolidone was charged. The reaction was then carried out at a temperature range of from 475 to 500° F. for 3 hours. Products were recovered by washing with water to remove sodium chloride salt and N-metyl-2-pyrrolidone and dried under vacuum. To study the effect of sodium thiosulfate pentahydrate, additional sodium thiosulfate was added to the sodium sulfide before dehydration and prior to the reaction with p-dichlorobenzene. p-Dichlorobenzene in solution in N-methyl-2-pyrrolidone was then reacted with the $Na_2S$ containing the additional sodium thiosulfate. The results are as shown in Table I.

TABLE I

| Run No. | Weight percent | | Polyphenylene sulfide polymer properties, melt flow range |
|---|---|---|---|
| | $Na_2S_2O_3$ in commercial $Na_2S$ | $Na_2S_2O_3$ in treated $Na_2S$ reactant | |
| 1 | 0.55 | 0.55 | 96–225 |
| 1 | 0.55 | 0.55 | 96 |
| 3 | 0.55 | 1.50 | 4,000 |
| 4 | 0.55 | 1.82 | 4,000 |

As illustrated by the above example, the presence of sodium thiosulfate significantly affects the melt flow of arylene sulfide polymers, specifically the higher the sodium thiosulfate content the higher the melt flow; or conversely, the lower sodium thiosulfate content the lower the melt flow.

EXAMPLE V

A series of runs were made to determine the effect of sodium hydroxide on polyphenylene sulfide polymers prepared from sodium sulfide containing sodium thiosulfate. Excess sodium thiosulfate was added to the hydrated sodium sulfide used in Example IV in order that the control polymer prepared would have a melt flow in excess of 4000. The control polymers were prepared as in Example IV and the melt flow tests were conducted as in Example II. The results of the study of the effects of the addition of sodium hydroxide to commercial flake sodium sulfide prior to being reacted with p-dichlorobenzene are shown in the table set out hereafter.

TABLE I

| Run No. | Weight percent | | | Arylene sulfide polymer properties, melt flow range |
|---|---|---|---|---|
| | $Na_2S_2O_3$ in commercial $Na_2S$ | $Na_2S_2O_3$ in treated commercial $Na_2S$ | NaOH in treated commercial $Na_2S$ | |
| 1 | 0.55 | 1.8 | 0.0 | 4,000 |
| 2 | 0.55 | 1.8 | 0.5 | 45–375 |
| 3 | 0.55 | 1.8 | 1.0 | 10–29 |
| 4 | 0.55 | 1.8 | 1.5 | 1–14 |
| 5 | 0.55 | 1.8 | 2.0 | 3–10 |

From the above data it is readily apparent that the polymer melt flow characteristics can be adjusted by addition of sodium hydroxide to sodium sulfide reactants which contain sodium thiosulfate. As illustrated the higher the sodium hydroxide content in proportion to the amount of sodium thiosulfate present in the treated sodium sulfide reactant the lower the melt flow value; or conversely, the lower the sodium hydroxide content is in proportion to the sodium thiosulfate the higher the melt flow values.

Although treatment of the alkali metal sulfide reactants with sodium hydroxide has been illustrated in the foregoing examples, any alkali metal hydroxide can be employed with comparable beneficial results.

With regard to adjustment of the sodium hydrosulfide content it is preferred in accordance with this invention that sodium hydroxide be added to the untreated sodium sulfide reactant since in this manner the sodium hydrosulfide is converted to sodium sulfide and water.

As will be apparent to those skilled in the art any means of properly regulating the relative amounts of alkali metal hydrosulfide, alkali metalthiosulfate or alkali metal hydroxide prior to reacting the alkali metal sulfide with the polyhalo-substituted aromatic compounds will yield the improved arylene sulfide polymers of this invention.

Preferably the alkali metal sulfide reacted with the polyhalo-substituted aromatic compounds to yield improved arylene sulfide polymers are suitably treated prior to contact with the polyhalo-substituted aromatic compound to provide an alkali metal sulfide reactant which contains less than 3 percent by weight alkali metal hydrosulfide, e.g., sodium hydrosulfide, and less than 1 percent by weight alkali metal thiosulfate, e.g., sodium thiosulfate, based on the weight of alkali metal sulfide, e.g., sodium sulfide. Even more preferred is the practice of this invention wherein the alkali metal sulfide reactant prior to treatment contains less than 3 percent by weight alkali metal hydrosulfide and less than 1 percent by weight alkali metal thiosulfate based on the weight of alkali metal sulfide. Additionally, it is preferred that the alkali metal sulfide reactant contain from about 0.0 to about 2.0 percent by weight alkali metal hydroxide, e.g., sodium hydroxide, more preferably from 0.0 to 0.5 weight percent alkali metal hydroxide prior to contact of the polyhalo-substituted aromatic compound under suitable reaction conditions in the preparation of the improved arylene sulfide polymers of this invention.

Any polyhalo-substituted aromatic compound can be employed in this invention. Representative compounds are 1,2-dichlorobenzene; 1,4-dichlorobenzene, 1,4,5-tribromobenzene; N,N-dimethyl-2,5-dibromoaniline; 1,2,4,5-tetrabromobenzene; hexachlorobenzene; 1,3,5-trichloro-2,4,6-triphenylbenzene; 1,2,4-trichlorobenzene; methyl 2,5-dichlorobenzoate; 2,5-dichlorobenzamide; 1,4-dibromonaphthalene; 4,4'-dichlorobiphenyl; 3,4-dibromothiophene; 3,4-dichlorofuran; 3,4-difluoropyrrole; 2,5-dichloropyridine; sodium 2,5-dibromobenzenesulfonate; p,p'-dichlorodiphenyl ether; 3,3'-dichlorodiphenyl dimethylsilane; di(2-methyl-4-bromophenyl)sulfoxide, methyl di-(3-ethyl-4-chlorophenyl)phosphite; 4-bromophenyl 3-n-butyl-4-chlorophenyl sulfone, and 2,6-dichloropyrazine. Because of their ready commercial availability and/or superior product preferred polyhalo-substituted aromatic compounds include 1,2-dichlorobenzene, 1,3-dichlorobenzene, 1,4-dichlorobenzene, and 1,2,4-trichlorobenzene. The monomers p-dichlorobenzene and 4,4'-dichlorobiphenyl produce especially attractive polymers.

Any polar organic compounds can be employed as reaction media in the reaction of this invention. Representative compounds include amides, lactams, and sulfones. More specifically, N-methyl-2-pyrrolidone, dimethylformamide, tetramethylurea, hexamethylphosphoramide, caprolactam, sulfolane and low molecular weight polyamides are examples of polar organic compounds which are particularly useful for this purpose.

The reaction of treated alkali metal sulfide with polyhalo-substituted aromatic compounds can be carried out in a polar solvent at a temperature of from 125° C. to about 450° C., preferably from 175° C. to 350° C. The mol ratio of polyhalo-substituted aromatic or heterocyclic compounds to treated alkali metal sulfide reactants should be at least 0.1:1 and will generally not exceed 2.0:1.

The amount of polar organic solvent in the reaction zone can vary over a wide range of from about 0.1 liter to 2.5 liters per gram mol of treated alkali metal sulfide.

The improved arylene sulfide polymers produced by the process of this invention exhibit melting or softening points that range all the way from liquids at 25° C. to polymers melting above 400° C. Said polymers can be heat treated in the absence of oxygen with an oxidizing agent either under vacuum or at atmospheric or superatmospheric pressures to increase the molecular weight by either a lengthening of a molecular chain or by cross-linking, or by a combination of both to improve such properties as tensile strength. Such treatment can be effected by heating the polymer, preferably at a temperature at least as high as to be within 100° F. of the melting point of the polymer. Such treatment can be carried out while contacting the polymer with air or under vacuum or under an inert gas such as nitrogen. The polymers produced by the process of this invention can be molded into a variety of useful articles by molding techniques which are well known in the art. Suitable molding techniques include injection molding, compression molding, vacuum forming and extrusion.

The polymers have utility in any use where high melting point and/or high temperature stability is desired. Said polymers can contain fillers, pigments, stabilizers, softeners, extenders and other polymers, e.g., polytetrafluoroethylene. The fillers include such items as graphite, magnesia, asbestos clays, wood, glass, and the like.

That which is claimed is:

1. A process comprising the steps: (1) contacting an alkali metal sulfide reactant comprising an alkali metal sulfide and an impurity selected from the class consisting of alkali metal hydrosulfide, alkali metal thiosulfate, and mixtures thereof, with an alkali metal hydroxide; and (2) subsequently reacting the thus contacted alkali metal sulfide reactant with a polyhalo-substituted aromatic compound to form an improved arylene sulfide polymer.

2. A process in accord with claim 1 step (1) wherein sufficient alkali metal hydroxide is added to the alkali metal sulfide reactant to reduce the alkali metal hydrosulfide and/or alkali metal thiosulfate content of the thus contacted alkali metal sulfide reactant.

3. A process in accord with claim 2 step (2) wherein the thus contacted alkali metal sulfide reactant contains 2.9, 1.0, or zero percent by weight alkali metal hydrosulfide and 1.0 percent by weight alkali metal thiosulfate, based solely on the weight of the alkali metal sulfide of the thus contacted alkali metal sulfide reactant.

4. A process in accord with claim 3 step (2) wherein the thus contacted alkali metal sulfide reactant contains 1.0 or zero percent by weight alkali metal hydrosulfide, based solely on the weight of the alkali metal sulfide of the thus contacted alkali metal sulfide reactant.

5. A process in accord with claim 4 step (2) wherein the thus contacted alkali metal sulfide reactant contains zero percent by weight alkali metal hydrosulfide based solely on the weight of the alkali metal sulfide of the thus contacted alkali metal sulfide reactant.

6. A process in accord with claim 5 step (2) wherein the thus contacted alkali metal sulfide reactant contains zero percent by weight alkali metal hydrosulfide and from about zero to about 2.0 percent by weight alkali metal hydroxide, based solely on the weight of the alkali metal sulfide of the thus contacted alkali metal sulfide reactant.

7. A process in accord with claim 1, wherein steps (1) and (2) the alkali metal is sodium.

8. A process in accord with claim 4, wherein steps (1) and (2) the alkali metal is sodium.

9. A process in accord with claim 6, wherein steps (1) and (2) the alkali metal is sodium.

10. A process in accord with claim 2 step (2) wherein the improved arylene sulfide polymer is formed under the following reaction conditions: (a) the mol ratio of the polyhalo-substituted aromatic compound to the alkali metal sulfide is within the range of from 0.1:1 to 2:1; (b) the reaction temperature is within the range of from 125° C. to 450° C; (c) the reaction is carried out in the presence of a polar organic solvent; and (d) the solvent is present within the range of 0.1 to 2.5 liters of polar organic solvent per gram mol of alkali metal sulfide.

11. A process in accord with claim 10 step (2) wherein the polyahalo-substituted aromatic compound is selected from the class consisting of 1,2-dichlorobenzene; 1,3-dichlorobenzene; 1,4-dichlorobenzene, 1,4,5-tribromobenzene; N,N-dimethyl-2,5-dibromoaniline; 1,2,4,5-tetrabromobenzene; hexachlorobenzene; 1,2,5-trichloro-2,4,6-triphenylbenzene; 1,2,4-trichlorobenzene; methyl-2,5-dichlorobenzoate; 2,5-dichlorobenzamide; 1,4-dibromonaphthalene; 4,4'-dichlorobiphenyl; 3,4-dibromothiophene; 3,4-dichlorofuran; 3,4-difluoropyrrole; 2,5-dichloropyridine; sodium 2,5-dibromobenzenesulfonate; p,p'-dichlorodiphenyl ether; 3,3'-dichlorodiphenyl dimethylsilane; di(2-methyl-4-bromophenyl)sulfoxide; methyl di(3-ethyl - 4 - chlorophenyl)phosphite; 4-bromophenyl-3-n-butyl - 4 - chlorophenyl sulfone; and 2,6-dichloropyrazine; and wherein the polar organic solvent is selected from the class consisting of N-methyl-2-pyrrolidone, dimethylformamide, tetramethylurea, hexamethylphosphoramide, caprolactam, sulfolane and low molecular weight polyamides.

References Cited

UNITED STATES PATENTS

| | | | |
|---|---|---|---|
| 3,268,504 | 8/1966 | Harris et al. | 260—125 |
| 3,354,129 | 11/1967 | Edmonds, Jr. et al. | 260—79 |
| 3,458,486 | 7/1969 | Ray et al. | 260—79.1 |

DONALD E. CZAJA, Primary Examiner

M. I. MARQUIS, Assistant Examiner

U.S. Cl. X.R.

260—37 R, 79, 900; 423—561